United States Patent [19]

Chiulli

[11] 4,114,044

[45] Sep. 12, 1978

[54] RADIOGRAPHIC CASSETTE ADAPTER

[76] Inventor: Robert D. Chiulli, 71 Cherry St., Somerville, Mass. 02144

[21] Appl. No.: 795,093

[22] Filed: May 9, 1977

[51] Int. Cl.² .............................................. G03B 41/16
[52] U.S. Cl. .................................... 250/468; 250/475
[58] Field of Search ............... 250/468, 475, 470, 471, 250/521

[56] References Cited

U.S. PATENT DOCUMENTS 3,293,430  12/1966  Wustner .............................. 250/468

Primary Examiner—Craig E. Church
Attorney, Agent, or Firm—Scott R. Foster

[57] ABSTRACT

An adapter assembly for radiographic film cassettes comprising a frame means having outside dimensions substantially equal to the outside dimensions of large sized radiographic film cassettes and adapted to be received and retained by holders for large sized radiographic film cassettes, and having an inside dimension substantially equal to an outside dimension of a smaller radiographic film cassette and being adapted to receive and retain the smaller sized cassette for radiographic operations, whereby to permit use of smaller sizes of radiographic film in a cassette holder or table tray otherwise adapted to handle only the large radiographic film.

10 Claims, 2 Drawing Figures

RADIOGRAPHIC CASSETTE ADAPTER

BACKGROUND OF THE INVENTION

1. Field of the Invention

This invention relates to radiographic devices and is directed more particularly to an adapter assembly by which a radiographic cassette holder fitted to accommodate only large sized radiographic film cassettes is adapted to utilize a plurality of standard sizes of radiographic film.

2. Description of Prior Art

A radiographic film cassette is a portable light-proof container equipped with two fluorescing screens between which a radiographic film is enclosed. There are three basic film sizes used for conventional static radiography and each has its own standard cassette size, to wit: 14 × 17 inch film is enclosed in a standard 15 × 18 inch cassette; 10 × 12 inch film is enclosed in a standard 11 × 13 inch cassette; and 8 × inch film is enclosed in a standard 9 × 11 inch cassette. Routine roentgenography utilizes upright holders and table trays which secure only the large cassettes, i.e. the 15 × 18 inch cassette when in a vertical position.

It is often appropriate to use a smaller film cassette, as for example in filming children or in obtaining small localized views of an area of particular concern to the radiologist. In such instances, it would be economical to use the intermediate sized film (10 × 12") or the small sized film (8 × 10"), the former representing a film cost savings of about 40% compared to the large sized film and the latter representing a film cost savings of about 60% compared to the large sized film. In addition, the area irradiated will usually be minimized with the use of the smaller films, which require coning of the X-ray beam. Resolution of the limited area of investigation will be correspondingly enhanced. Generally, such possible economical and radiobiological advantages are not realized by virture of the cassette holder accepting only the large (15 × 18") cassettes.

SUMMARY OF THE INVENTION

An object of the present invention is to provide a radiographic cassette adapter assembly by which a conventional cassette holder or table tray can be adapted to accept smaller and more economical films for upright radiography.

With the above and other objects in view, as will hereinafter appear, a feature of the present invention is the provision of an adapter assembly for radiographic film cassettes, the adapter comprising frame means having outside dimensions substantially equal to the outside dimensions of large film cassettes, and adapted to be received and retained by holders for the large film cassettes in X-ray machines, and having an inside dimension substantially equal to an outside dimension of a smaller radiographic film cassette and being adapted to receive and retain said smaller film cassette for radiography whereby to permit use of smaller sizes of radiographic film in a cassette holder or table tray otherwise adapted to handle only the large radiographic film.

The above and other features of the invention, including various novel details of construction and combination of parts will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention from which its novel features and advantages will be apparent.

DESCRIPTION OF THE PREFERRED EMBODIMENT

Figure 1:
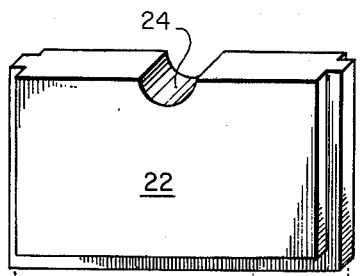
FIG. 1 is an exploded perspective view of one form of adapter assembly illustrative of an embodiment of the invention.
Figure 1:
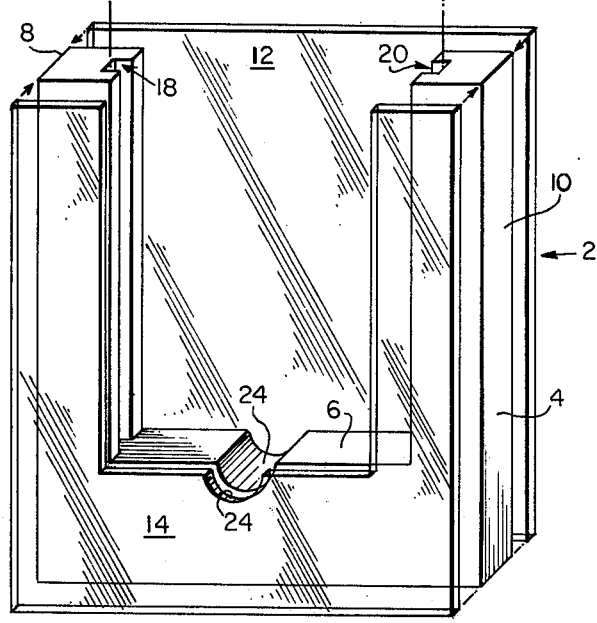
Figure 2:
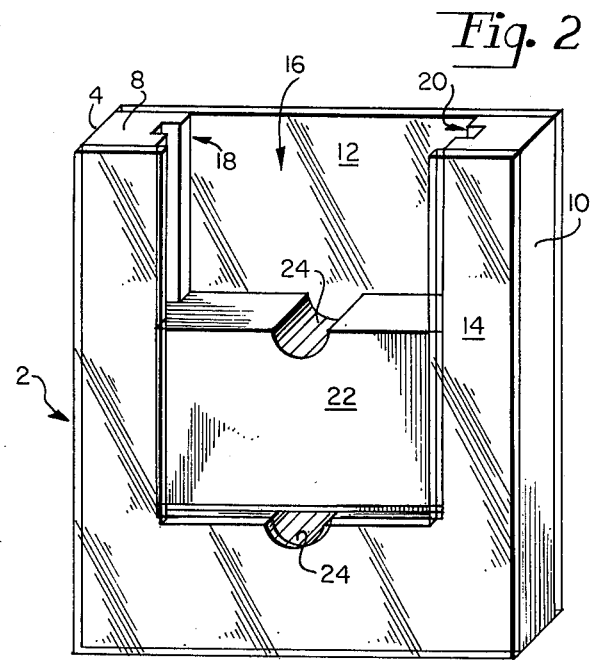
FIG. 2 is a perspective view of the adapter assembly of FIG. 1.

Referring to the drawings, it will be seen that the illustrative embodiment includes a frame means 2 comprising a frame member 4 having a bottom portion 6 and two upright portions 8, 10, a back portion 12 and a front portion 14. The frame member 4, back portion 12, and front portion 14 provide an open ended housing (FIG. 2) adapted to slidingly receive a radiographic film cassette by way of the open end 16. The front portion 14 extends inwardly beyond the frame member 4 so as to retain a cassette but permit visualization of the majority of the area of the cassette therein.

The upright portions 8, 10 of the frame member 4 may be provided with opposed grooves 18, 20 extending from the free ends of the upright portions to the bottom portion 6 and adapted to slidingly receive an insert 22. The insert 22 and the frame means front portion 14 and bottom portion 6 may be provided with finger holes 24 to permit ready removal of the insert 22 and/or cassettes from the frame means.

The frame means is of a configuration and of outside dimensions (15 × 18") substantially equal to the configuration and outside dimensions of a standard large sized radiographic film cassette. Accordingly cassette holders and trays adapted to receive only the 15 × 18 inch cassette may receive instead the frame means 2 to facilitate use of a smaller cassette containing less expensive film. The thickness of the frame member 4 is substantially equal to the thickness of a radiographic film cassette and the inside dimensions of the frame member 4 are of a width substantially equal to one side of an intermediate and a small radiographic film cassette and of a length which, in all cases exceeds the longest side of the intermediate sized cassette (11 × 13"). Therefore, an intermediate or small sized cassette may be slidingly moved into the frame means by way of the opening 16. The front portion 14 retains the cassette within the frame means but exposes most of its front facing area. A radiograph may then be taken, using the smaller film rather than the more expensive 14 × 17 inch film.

In order to use the small cassette (9 × 11"), it is necessary to first place an insert 22 of the appropriate height into the adapter assembly to localize the small sized cassette to the position required by the examination at hand. If the insert is not used, the cassette will be positioned at the bottom of the frame, often below the field of interest. An appropriate insert 22 for the position desired is first introduced into the grooves 18, 20, followed by the corresponding cassette. The insert 22, in the position shown in FIG. 2, acts as a support for the cassette, keeping the supported cassette in the selected position.

It will be apparent that various configurations and sizes of inserts 22 may be provided and used to meet particular radiographic objectives.

In operation, a technician decides what size smaller film and what orientation of the smaller film will be appropriate for the examination at hand and selects an insert, if desired, to achieve the correct position of the cassette within the adapter assembly. The insert, or inserts (a plurality of inserts may be used if desired), are slid into the adapter, with the finger holes 24 disposed upwardly to facilitate removal of the cassette. The cassette is then slid into the assembly which will retain the cassette in the correct position. The entire unit then is slid into the upright holder or table tray and the radiograph taken, after which the cassette is removed from the assembly and the film developed.

Thus, X-ray machine cassette holders heretofore requiring the use of large, expensive film sizes are given the facility of accommodating smaller, less expensive films.

It is to be understood that the present invention is by no means limited to the particular construction herein disclosed and/or shown in the drawings, but also comprises any modifications or equivalents within the scope of the disclosure.

Having thus described by invention, what I claim as new and desire to secure by Letters Patent of the United States is:

1. An adapter assembly for radiographic film cassettes comprising a frame member having a bottom portion and two upright portions extending therefrom, a back portion, and a generally U-shaped front portion, said portions providing an open-ended housing, said frame member having outside dimensions substantially equal to outside dimensions of a first size radiographic film cassette and adapted to be received and retained by holders for said first size radiographic film cassette in radiographic machines, said frame means further having an inside dimension substantially equal to an outside dimension of a smaller size radiographic film cassette and being adapted to slidingly receive and retain said smaller size radiographic film cassette for radiographic operations.

2. The invention according to claim 1 in which said frame means comprises a frame member having a bottom portion and two upright portions extending therefrom, a back portion, and a generally U-shaped front portion, said portions providing an open-ended housing adapted to slidingly receive and retain said smaller size cassette.

3. The invention according to claim 1 in which the configuration of said front portion corresponds generally with the configuration of said frame member but extends inwardly therefrom to retain said smaller size radiographic film cassette therein but expose the majority of a surface of said smaller size cassette for visualization.

4. The invention according to claim 1 in which said assembly includes an insert, and said frame means is adapted to receive and retain said insert, the frame member and the insert together being adapted to receive and retain said smaller size cassette and being further adapted to receive and retain a third size cassette.

5. The invention according to claim 4 wherein said smaller and said third size cassettes are retained by said assembly in a raised position, said smaller and third size cassettes resting upon said insert.

6. The invention according to claim 1 in which said upright portions are provided with groove means for receiving an insert, the frame means and the insert together having an inside dimension substantially equal to an outside dimension of a smaller size radiographic film cassette and being adapted to receive and retain said smaller size cassette.

7. The invention according to claim 6 wherein said smaller size cassette is retained by said assembly in a raised position, said smaller size cassette resting upon said insert.

8. The invention according to claim 4 wherein said smaller and third size cassettes abut said insert and are positioned in said assembly thereby.

9. The invention according to claim 6 wherein said smaller and third size cassettes abut said insert and are positioned in said assembly thereby.

10. The invention according to claim 1 wherein said front portion is provided with finger hole means to facilitate removal of said smaller size cassette from said housing.

* * * * *